Aug. 1, 1944.   W. A. O'DONNELL   2,354,961
UNIVERSAL JOINT
Filed July 5, 1941   4 Sheets-Sheet 1
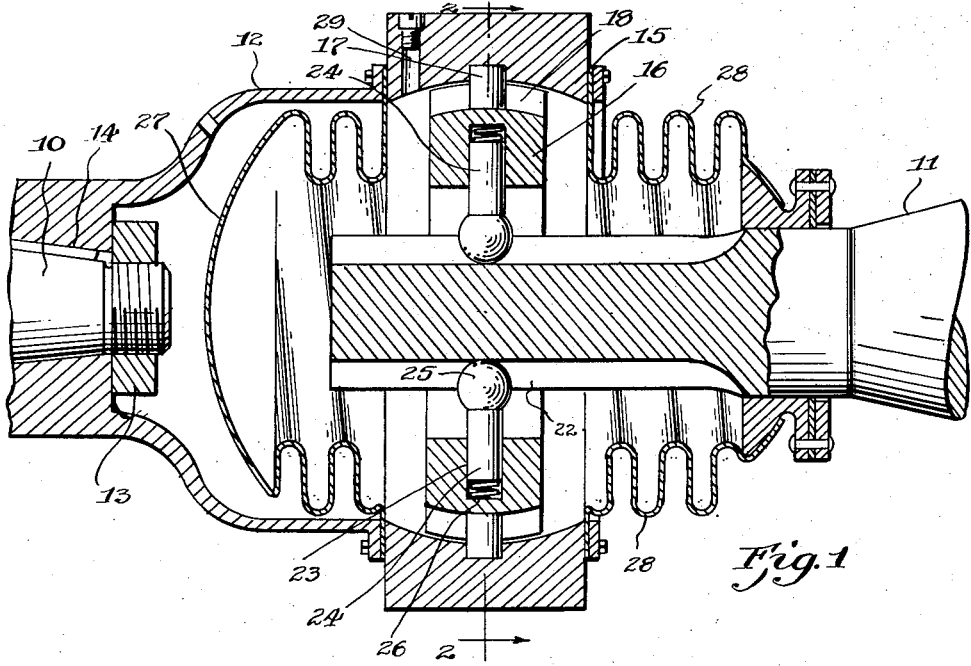
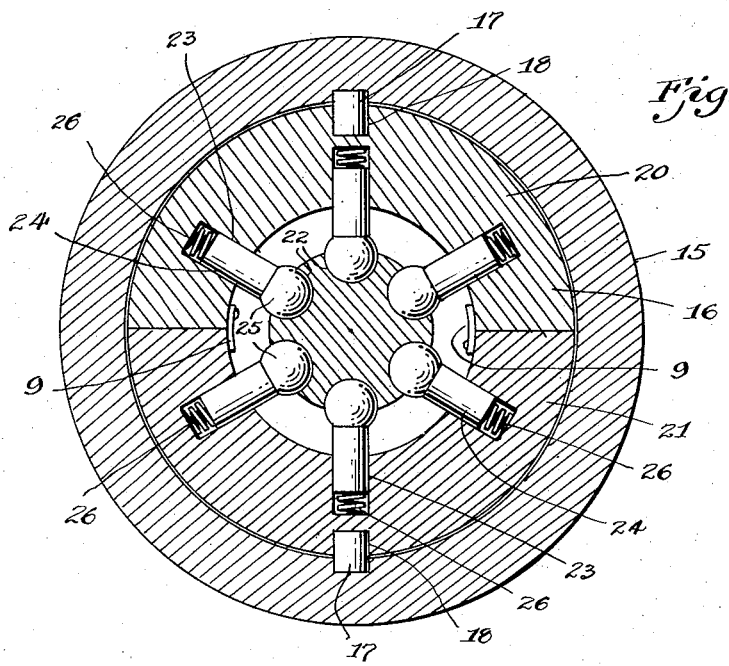
INVENTOR.
William A. O'Donnell
BY
Barnes, Kisselle, Laughlin & Raisch
Attorneys.

Aug. 1, 1944.   W. A. O'DONNELL   2,354,961
UNIVERSAL JOINT
Filed July 5, 1941   4 Sheets-Sheet 2

INVENTOR.
William A. O'Donnell
BY Barnes, Kisselle, Laughlin & Raisch
Attorneys.

Aug. 1, 1944.   W. A. O'DONNELL   2,354,961
UNIVERSAL JOINT
Filed July 5, 1941   4 Sheets-Sheet 3

INVENTOR.
William A. O'Donnell
BY Barnes, Kisselle, Laughlin & Raisch
Attorneys.

Aug. 1, 1944.     W. A. O'DONNELL     2,354,961
UNIVERSAL JOINT

Filed July 5, 1941     4 Sheets-Sheet 4

INVENTOR.
William A. O'Donnell
BY
Barnes, Kisselle, Laughlin & Raisch
Attorneys.

Patented Aug. 1, 1944

2,354,961

UNITED STATES PATENT OFFICE 2,354,961

UNIVERSAL JOINT

William A. O'Donnell, Detroit, Mich.

Application July 5, 1941, Serial No. 401,146

15 Claims. (Cl. 64—8)

This invention relates to universal joints for the transmission of power.

With engineering advancements, the operating speeds of engines have been steadily increasing. These operating speeds in some cases, for example, the motor vehicle, are increasing to a point where they introduce problems of vibration and the like in their design. The universal joint has tolerances which it is not only extremely difficult but extremely expensive to attempt to lessen in mass production. These tolerances introduce factors of vibration and wear that are becoming serious at present engine speeds. It is an object of this invention to minimize these factors thereby improving the performance and compensating for even greater tolerances than are now considered allowable. The provision of a universal joint in which greater tolerances are permissible will decrease the cost of manufacture.

A fluid under pressure is used to effect the desired results and compensate for inaccuracies in machining the component parts of the universal joint.

Two principal forms of universal joints embodying the present invention are illustrated in the drawings. The same invention could be applied to other universal joints, however.

In the drawings

Fig. 1 is a vertical section of one form of universal joint.

Fig. 2 is a section on the lines 2—2 of Fig. 1.

Figure 3:
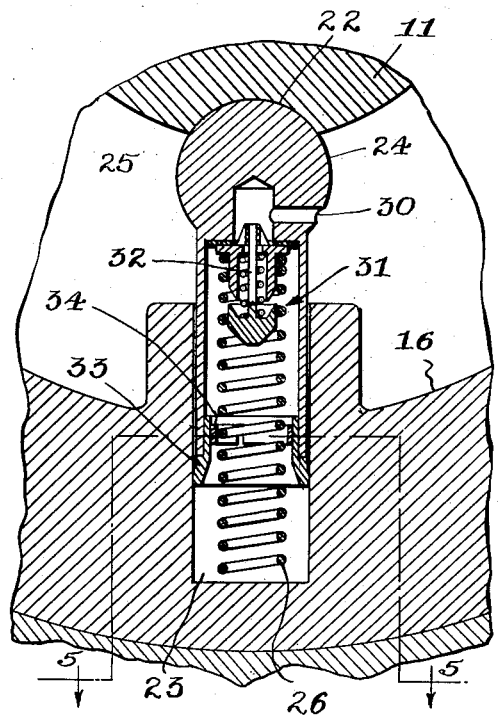
Fig. 3 is a sectional view of a plunger.

The universal joint to be described connects a driving shaft and a driven shaft. For purposes of description, the shaft 10 of Fig. 1 will be referred to as the driving shaft and the shaft 11 as the driven shaft. A vented cylindrical housing 12 is fastened upon the tapered end of shaft 10 by nut 13 and key 14. Universal action is obtained by the relative movement between two concentric rings 15 and 16 provided with spherical engaging surfaces. The ring 15 is fastened to the housing 12 and provided with an aligned pair of pins 17. The ring 16 is provided with a pair of keyways 18 which are curved and extend in plane axially of the rings. The ring 16 is formed from two semi-circular portions 20 and 21 which are fastened at 9 to permit relative movement in the plane of the keyways.

The driven shaft 11 extends through the ring 16 into the housing 12. The shaft 11 is provided with a plurality of longitudinal grooves or flutes 22 of circular cross section spaced about its periphery. The ring 16 is provided with a plurality of radial cylindrical holes 23 equal in number to the flutes provided in the shaft 11. In each radial hole a plunger 24 is slidably positioned. Each plunger 24 is provided with a spherical head 25 adapted to seat in a groove 22 as shown in Fig. 2. Springs 26 positioned in the bottom of holes 23 urge the plungers into engagement with the shaft 11. Flexible element 27 is fastened to housing 12. Flexible element 28 is fastened to ring 15 and fixedly mounted upon shaft 11. The radial plungers are in plane.

A means to obtain universal action has been described. Relative movement between the rings 15 and 16 gives a universal action. The ring 16 may rotate about pins 17 or keyways 18 may slide thereon as ring 16 is deflected about an axis at right angles to the plane of the keyways. Combination of these two movements permits universal movement. Rotation of shaft 10, housing 12 and ring 15 rotates ring 16 by the engagement of pins 17 and keyways 18. Rotation of ring 16 is transmitted to shaft 11 through plungers 24 engaging in grooves 22. Due to the sliding contact of plungers 24 with grooves 22 the driven shaft 11 may be extended longitudinally relative to the driving shaft 10.

A quantity of liquid such as oil is placed within the space formed by the ring 16 and the flexible elements 27 and 28. An opening 29 is provided for this purpose. Flexible element 28 permits relative deflection and a longitudinal extension of the shafts. Flexible element 27 compensates for the displacement of the liquid due to this action. The flexible elements 27 and 28 are of the bellows type and are helical in formation. The lands have a helical form. The helical form is desirable for it permits the element to expand or contract with a uniform bending. The bending does not occur in localized areas as would be the case if the lands were merely a plurality of circles.

Figure 4:
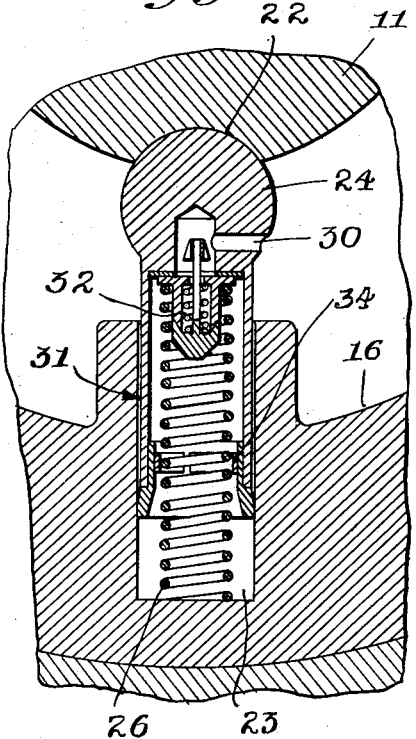
Fig. 4 is a view similar to Fig. 3 but showing the liquid valve in closed position.
Figure 5:
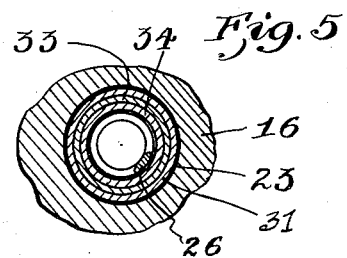
Fig. 5 is a section on the lines 5—5 of Fig. 3.

Referring to Figs. 3 through 6, the plungers will be described in detail. The spherical head 25 of each plunger 24 is provided with a small opening 30 which connects with the hollow stem 31 of the plunger. A one way valve 32 is positioned between the opening 30 and the hollow stem 31. The hollow stem 31 and cylindrical hole 23 thus form a container for the liquid which may be sealed by the valve 32. The valve 32 is adapted to permit entry of the liquid but prevent its escape. To the skirt of the plunger 24 is attached a flexible seal 33 held in place by expansion ring 34 and which prevents the escape of liquid between the hollow stem 31 and the cylindrical hole 23. The engagement of the plunger head in the groove or flute of the shaft 11 is made firm by the pressure of the imprisoned liquid. Fig. 3 shows the valve 32 in open position to receive liquid within the plunger. Fig. 4 shows the valve closed and the liquid sealed therein.

Figure 6:
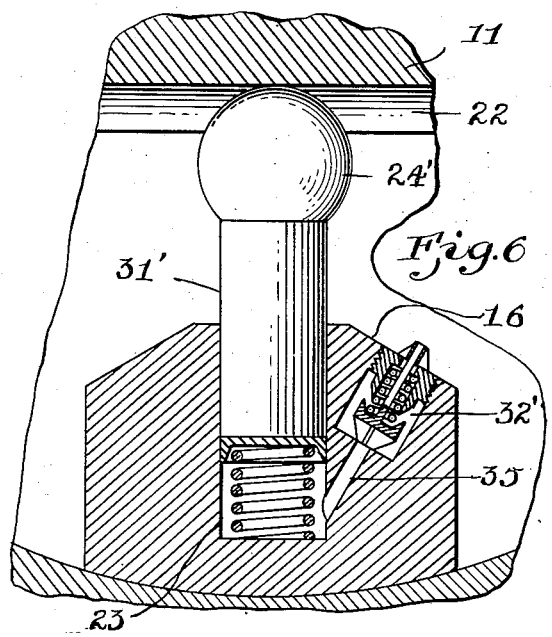
Fig. 6 is a view similar to Fig. 3 but showing a slightly modified form of plunger and valve.

A modified form of the device is shown in Fig. 6 where the valve 32' is positioned in an opening in the ring 16 and connected by passage 35 with the hole 23. The operation of this form of the device is very similar to that previously described.

In the operation of the device, when the shaft 10 is rotated the torque is transmitted through housing 12, ring 16, plunger 24 and grooves 22 to the shaft 11. The liquid retained within the flexible elements 27 and 28 moves radially outward under the influence of centrifugal force. As the liquid is forced outward the valves 23 in the plungers permit the centrifugal force to force the liquid within the hollow stem of the plunger to thereby cause the plunger heads to firmly engage the shaft 11. Even though rotation of the shaft is stopped, the liquid remains imprisoned within the plunger. In the event that the plunger heads or the surface of shaft 11 become worn, an additional amount of liquid will pass through valve 32 to again firmly engage the plunger with the shaft 11. Any wear of the plunger heads or the shaft 11 is, therefore, compensated.

Another portion of the device where a perfect fit of component parts is desirable is the engaging surfaces of rings 15 and 16. As previously described, the ring 16 is formed from two semi-circular portions 20 and 21. Centrifugal force will cause portions 20 and 21 to fly outward into more firm engagement with the ring 15. The liquid supply held within the flexible elements 27 and 28, when under the influence of centrifugal force, will separate the portions 20 and 21 from the ring 15 and compensate for any improper surfacing of the parts. The keyway 18 is preferably slightly deeper than the projecting portion of pins 17 so that the pins 17 will not obstruct the outward movement of the portions 20 and 21 above described.

Figure 7:
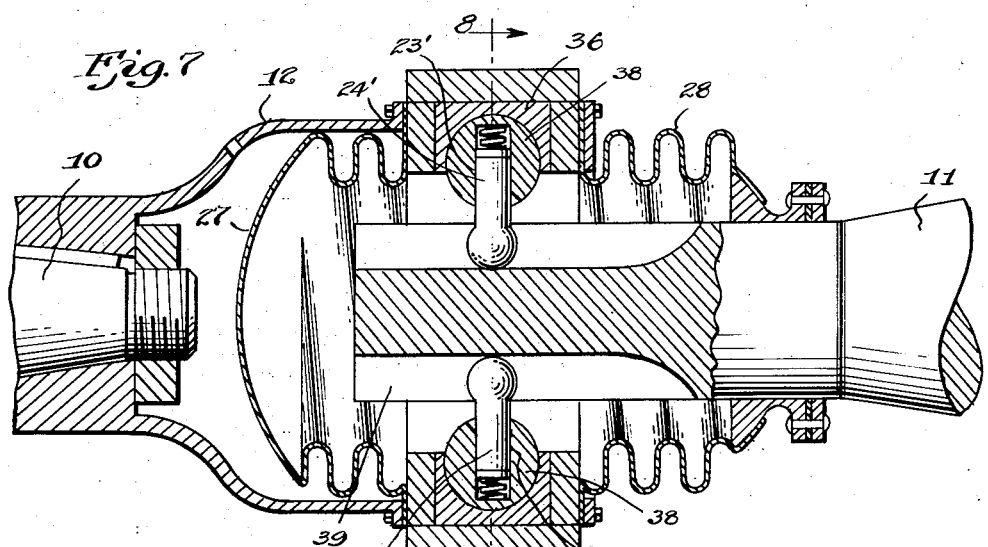
Fig. 7 is a longitudinal vertical section of a different form of universal joint.
Figure 8:
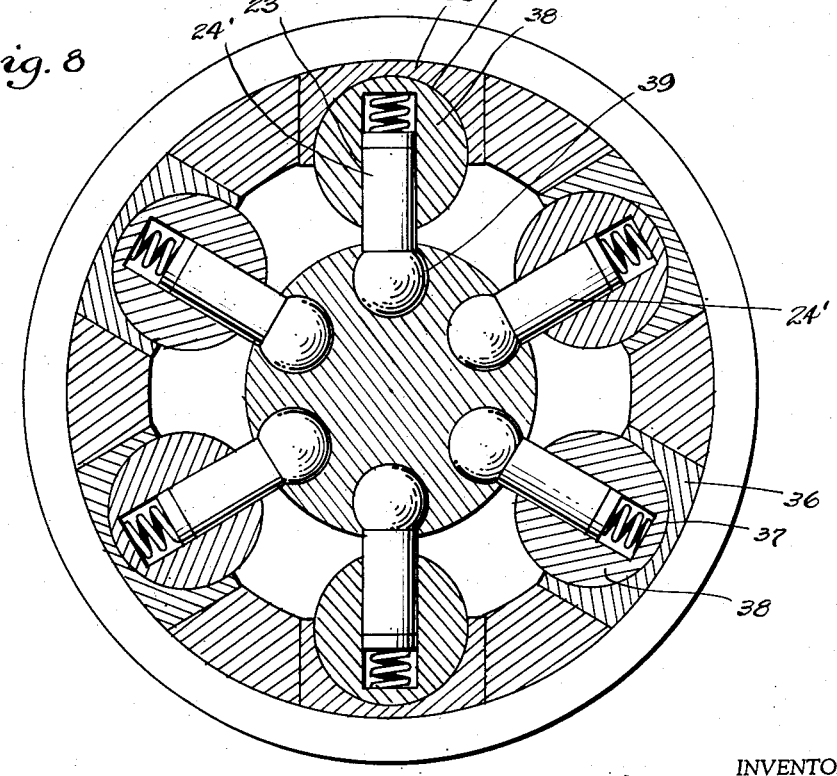
Fig. 8 is a section on the lines 8—8 of Fig. 7.

In Figs. 7 and 8, another form of universal joint embodying the invention is shown. Shafts 10 and 11 and housing 12 and the flexible elements 27 and 28 are substantially the same as in the form described in Fig. 1. A ring 36 fastened to housing 12 is, however, provided with a plurality of spherical sockets 37 in which a plurality of spherical balls 38 is fitted. Radial cylindrical holes 23' are formed in the spherical balls 38 and plungers 24' are slidably fitted within the holes 23'. The plungers themselves are substantially identical with those previously described in Figs. 3 and 4. The plunger heads are embedded in the flutes 39 of shaft 11. The flutes are circular in cross section and present an opening of less width than the diameter of the flutes. The plunger heads are, therefore, held therein. The flutes 39 prevent motion of the plungers about their embedded heads in a plane lateral to the shaft 11. When shaft 10 is driven by a suitable power source, torque is transmitted through housing 12, ring 36, plungers 24' and shaft 11. Shaft 11 may, however, be extended due to the sliding engagement of the plungers and flutes or it may be deflected due to the ball and socket joints provided on the base of the plungers.

The operation of this form of the invention is substantially similar to that already described in that centrifugal force acting upon the liquid forces it inside the plungers and causes them to firmly engage the shaft 11. Any wear of the plunger heads or shaft 11 is compensated for by the entrance of more liquid into the plunger.

Figure 9:
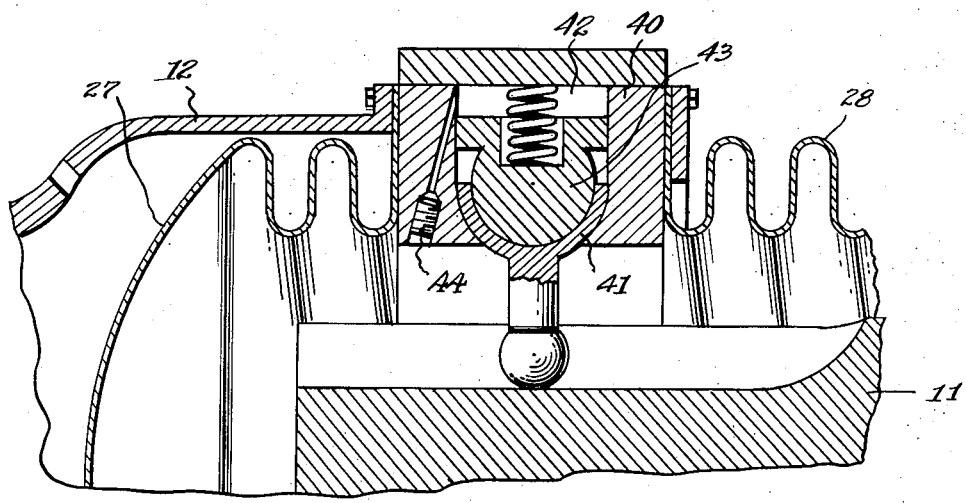
Fig. 9 is a section of a modified type of plunger for use in the Fig. 7 form of universal joint.

In Fig. 9 is illustrated an alternative type of plunger which has a stop to prevent its being extended too far should the wear become excessive and the torque tend to extract the plunger from its socket. In this form of the invention a ring 40 has a plurality of enlarged openings 42 out of which the plungers project. The base of the plunger has a cup-shaped portion 41 adapted to engage the lip of the opening 42. A ball and socket action is thus obtained. A ball 43 is resiliently held against the plunger and the one way valve positioned at 44. The operation of the device is very similar to that described in Fig. 7, except that the lip of the opening 42 and the cup-shaped portion 41 limit the outward movement of the plunger.

Figure 10:
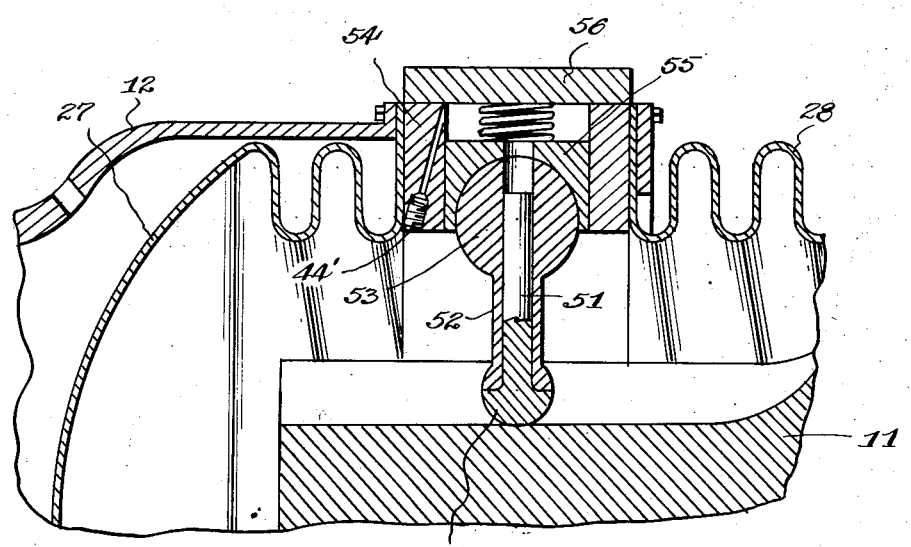
Fig. 10 is a sectional view of a further modified form of plunger for use in the Fig. 7 type of universal joint.

Fig. 10 illustrates a modified type of plunger. During the transmission of torque to the shaft 11 the force is applied by the plunger head to two points on the engaging flute of shaft 11. The two points referred to are the lip of the flute where it engages the neck of the plunger and a reaction point on the opposite side of the spherical head. In order to minimize wear of the engaging surfaces of the plunger head and in order to compensate for wear, the plunger is made of two parts—a semi-spherical head 50 having a stem 51 and a sleeve 52 having a ball base 53. The stem 51 is rotatably retained within the sleeve 52. The ball 53 fits within a suitable spherical socket 54 provided in a slidable element 55 which is slidably mounted for radial movement within a ring 56. Suitable abutments (not shown) may be provided on the ring 56 to prevent the slidable element 55 from moving circumferentially of the ring 56 during the transmission of torque. A one way valve 44' similar to that described in Fig. 5 may be provided to control the entrance of liquid under the influence of centrifugal force to the space between the slidable element 55 and the ring 56 and thereby control the extension of the plunger. The semi-spherical head 50 on the stem 51 is able to rotate relative to the rest of the plunger with a minimum of friction. This is important when there is a rolling of the plunger in the flute as the shaft is deflected in any plane other than the plane of the plunger. In some instances, as for example when the driven shaft is extended longitudinally while torque is being transmitted, the direction of rotation of the neck of the plunger in the flute is opposite to the direction of rotation of the spherical head due to the fact that the torque causes the engaging portion of the plunger neck and the reaction point on the plunger head to be on opposite sides of the plunger axis. The plunger head 50 may rotate in this opposite direction and minimize wear. In addition, when the flute and ball become worn and loose and the depth of the flute greater than its original diameter, the pressure of the liquid retained behind element 55 by the one way valve may act upon stem 51 and extend the semispherical head 50 to compensate for the wear.

What I claim is:

1. A universal joint comprising a driving shaft, a driven shaft, a member on one of said shafts having an axial opening therein adapted to receive the end of the second shaft, a plurality of plungers spaced about the interior of said member, a quantity of liquid retained within said opening, means to connect the outer ends of said plungers to said liquid and means to utilize the effect of centrifugal force on said liquid to force liquid through said passages to project said plungers substantially radially of said shafts into firm engagement with said second shaft.

2. In a universal joint comprising a driving shaft, a driven shaft and means for effecting universal movement between said shafts comprising a member on one of said shafts having an axial opening therein adapted to receive the end of the second shaft, said member having a plurality of radial openings spaced about its periphery, a plunger slidably mounted in each of said openings, means forming a pressure chamber at the outer end of each of said plungers, and hydraulic means to create pressure in said chambers to project said plungers into firm engagement with said second shaft.

3. In a universal joint comprising a driving shaft, a driven shaft and means for effecting universal movement between said shafts comprising a member on one of said shafts having an axial opening therein adapted to receive the end of the second shaft, said member having a plurality of radial holes spaced about its interior surface, a plunger slidably mounted in each of said holes, a seal connecting said member and said second shaft, a quantity of liquid retained in said axial opening by said seal, a passageway connecting said axial opening with the bottom of each of said radial holes whereby centrifugal force will cause said liquid to exert pressure on the base of said plungers to hold them in firm engagement with said second shaft.

4. A universal joint comprising a driving shaft, a driven shaft and means for effecting universal movement between said shafts comprising a member on one of said shafts having an axial opening therein adapted to receive the end of the second shaft, said member having a plurality of radial holes spaced about its inner surface, a plunger slidably mounted in each of said holes, each of said plungers having a spherical head, said second shaft being provided with a plurality of longitudinal grooves on its periphery adapted to receive said spherical heads, means forming a pressure chamber at the outer end of each of said plungers, and hydraulic means to create pressure in said chambers to hold the spherical heads of said plungers in said grooves to firmly engage said second shaft.

5. In a universal joint comprising a driving shaft and a driven shaft, a first member on one of said shafts and a second member positioned within said first member and having an axial opening therein adapted to receive the end of the second shaft, cooperating key and slot means on said first and second members for universal movement therebetween, said second member having a plurality of radial openings spaced about its interior, a plunger slidably mounted in each of said openings and hydraulic means to project said plungers into firm engagement with said second shaft.

6. A universal joint comprising a driving shaft, a driven shaft, a first member on one of said shafts, a second member positioned within said first member and having an axial opening therein adapted to receive the end of the second shaft, said second member comprising a plurality of elements adapted to move radially outward under the influence of centrifugal force and effect a close engagement between said members, cooperating key and slot means on said first and second members for universal movement therebetween, said second member having a plurality of radial openings spaced about its interior, a plunger slidably mounted in each of said openings and hydraulic means to project said plungers into firm engagement with said second shaft whereby the radial movement of said elements is compensated.

7. A universal joint comprising a driving shaft, a driven shaft, a first member on one of said shafts, a second member positioned within said first member and having an axial opening therein adapted to receive the end of the second shaft, said second member comprising a plurality of elements adapted to move radially outward, means to supply a fluid between the adjacent surfaces of said elements and said first member whereby the radial movement of said elements reacts upon said fluid to compensate for surface irregularities in said members, cooperating key and slot means on said first and second members for universal movement therebetween, said second member having a plurality of radial openings spaced about its interior, a plunger slidably mounted in each of said openings, hydraulic means to project said plungers into firm engagement with said second shaft whereby the radial movement of said elements is compensated.

8. A universal joint including a driving shaft, a driven shaft, and connecting means between said shafts to permit universal movement comprising a member on one of said shafts having an axial opening therein adapted to receive the end of the second shaft, means to seal the interior of said member, a quantity of liquid positioned within said member, said member being provided with a plurality of spherical sockets spaced about its interior surface, a plurality of spherical balls mounted within said sockets, each of said balls having a cylindrical opening therein, a plunger slidably mounted in each of said openings, and means to utilize the effect of centrifugal force on said liquid to project said plungers substantially radially of said shafts into firm engagement with said second shaft.

9. A universal joint comprising a driving shaft, a driven shaft, and connecting means between said shafts comprising a member on one of said shafts having an axial opening therein adapted to receive the end of the second shaft, said member having a plurality of spherical sockets spaced about its interior surface, a plurality of spherical balls fitted within said sockets, each of said balls having a cylindrical opening therein, a plurality of plungers each provided with a spherical head slidably mounted in said cylindrical openings, said second shaft being provided with a plurality of longitudinal flutes of circular cross section presenting an opening in said shaft of less width than the diameter of said flutes for retaining said plunger heads within said flutes, hydraulic means to project said plungers into firm engagement with said second shaft whereby said connecting means may permit relative universal movement between said shafts and said hydraulic means may compensate for wear and inaccuracies of construction.

10. A universal joint comprising a driving shaft, a driven shaft, a member on one of said shafts having an axial opening therein adapted to receive the end of the second shaft, a spiral bellows closing one end of said axial opening, a plurality of plungers spaced about the interior of said member, said second shaft having a plurality of longitudinal flutes adapted to receive said plungers and permit relative longitudinal movement between said shafts, a spiral bellows type seal fastened to said member and mounted upon said second shaft to close the other end of the axial opening, a quantity of liquid retained within said member, means forming a pressure chamber at the outer end of each of said plungers, means to connect said chambers with said body of liquid, and means to utilize the effect of centrifugal force on said liquid to create pressure within said chambers to project said plungers substantially radially of said shafts into firm engagement with said second shaft whereby said spiral type of bellows may compensate for displacement of said liquid upon relative longitudinal movement of said shafts.

11. A universal joint comprising a driving shaft, a driven shaft, a member on one of said shafts having an axial opening therein adapted to receive the end of the second shaft, a plurality of elements slidably mounted radially of said member, each of said elements having a spherical socket, a plurality of plungers mounted in said sockets, said plungers comprising a spherical ball adapted to fit in said socket and a stem on said ball, said stem and said ball having an opening therethrough, a semi-spherical head, a spindle on said head adapted to rotatably fit in said opening whereby said plunger heads may freely rotate relative to said plungers stems, said second shaft having a plurality of longitudinal flutes adapted to receive said plunger heads and hydraulic means to project said elements and said plungers into firm engagement with said second shaft.

12. A power transmitting joint comprising a driving shaft, a driven shaft, a member on one of said shafts having an axial opening therein adapted to receive the end of the second shaft, a plurality of plungers slidably mounted radially of said member and adapted to engage said second shaft, means forming a pressure chamber at the outer end of each of said plungers, and hydraulic means to create pressure in said chambers to project said plungers into firm engagement with said second shaft and means to limit the radial movement of said plungers whereby torque may be transmitted between said shafts.

13. A universal joint comprising a driving shaft, a driven shaft and means to permit universal movement between said shafts comprising a member on one of said shafts having an axial opening therein adapted to receive an end member on said second shaft, a plurality of plungers radially spaced about one of said members, said other member being provided with a plurality of longitudinal grooves, means forming a pressure chamber at the outer end of each of said plungers, and hydraulic means to create pressure in said chambers to hold said plungers in engagement with said grooves and couple said shafts whereby relative axial movement of said members and shafts is permitted.

14. In a universal joint comprising a driving shaft and a driven shaft, a first member on one of said shafts, a second member positioned within said first member and having an axial opening therein adapted to receive the end of the second shaft, means for effecting universal movement between said first and said second member, said second member having a plurality of radially spaced holes, a plunger slidably mounted in each of said holes, means forming a pressure chamber at the outer end of each of said plungers, and hydraulic means to create pressure in said chambers to project said plungers into firm engagement with said second shaft.

15. A universal joint comprising a driving shaft and a driven shaft, a member on one of said shafts having an axial opening therein adapted to receive an end member on the second shaft, one of said members having a plurality of radially spaced spherical sockets a spherical ball fitted within each of said sockets, said spherical balls having openings therein substantially radial of said member, a plunger slidably mounted in each of said radial openings, and hydraulic means to hold said plungers in firm engagement with said other member.

WILLIAM A. O'DONNELL.